July 5, 1966  J. S. RUSH  3,259,386
METHOD OF AND SYSTEM FOR STAGING PRODUCTIONS
Filed Feb. 5, 1964  2 Sheets-Sheet 1

INVENTOR.
JOHN S. RUSH
BY
ATTORNEY

July 5, 1966  J. S. RUSH  3,259,386

METHOD OF AND SYSTEM FOR STAGING PRODUCTIONS

Filed Feb. 5, 1964  2 Sheets-Sheet 2

INVENTOR.
JOHN S. RUSH
BY
ATTORNEY

3,259,386
METHOD OF AND SYSTEM FOR STAGING PRODUCTIONS
John S. Rush, 2034 N. Argyle Ave., Hollywood, Calif.
Filed Feb. 5, 1964, Ser. No. 342,693
6 Claims. (Cl. 272—10)

This invention relates to the presentation of scenes, both picture and live, in a serial order, such as picture-to-live, and vice versa, and particularly to a method of and system for providing viewers with an intermingling of picture and live scenes to enhance the depicting of stories for entertainment, education, and documentation.

It is realized that transitions or dissolve illusions between motion picture action and live action are known, as evidenced by U.S. Patents Nos. 3,035,836, of May 22, 1962, 3,084,933, of April 9, 1963, and 3,085,799, of April 16, 1963. These prior systems, however, only provide certain types of illusions but not the rapid transition, dissolve, or intermingling of pictorial and live actions possible with this invention.

The present invention is one which automatically provides a transition or "transmergence" from motion picture screen action to live action during which the picture scene may be duplicated by a live scene. The transition is made in an extremely short interval of time so that the observers are practically unaware of the change until the live actors move about the stage and speak. Furthermore, the transition back from live action to picture action is accomplished with the same rapidity so that observers are again substantially unaware of the change.

For instance, an instruction or training film of a hand-operated gun is being used to instruct personnel in its use and construction. The picture will show the general use of the weapon in the field with broad pastoral or wooded scenes for which the particular weapon is designed. The motion picture will continue until the instructor is shown holding the weapon in a close-up scene, at which instant a transition is made to a live instructor in the exact position of the picture of the instructor, who will then take the weapon apart, piece by piece, and illustrate its construction to the personnel. The instructor can walk about the stage and solicit volunteers from the audience to aid in the instruction. The instructor is then cued to take a certain predetermined position on the stage just before the shift, and he is returned to the picture if the script calls for it. This is only one use, and it is realized that for theatrical performances, night clubs, etc., the use of such rapid transition between picture and live action, and vice versa, made in such a short period of time can provide particularly spectacular illusions.

Another illustration of the use of the invention is when the picture shows an airplane releasing a bomb after which the screen is removed and a small explosion is produced on the stage with its accompanying fire and smoke.

The system may be fully automatic or semi-automatic, depending upon the character of the presentation. The motion picture film can control one shift, and the reverse shift may be controlled manually. During the transitions, the screen is removed and replaced by a mechanism to be described hereinafter.

The principal object of the invention, therefore, is to facilitate the transition between pictorial and live action scenes.

Another object of the invention is to provide an improved method of and system for rapidly transmerging a scene from picture action to live action.

A further object of the invention is to provide apparatus which will automatically control the transition between picture and live actions.

A better understanding of this invention may be had from the following detailed description when read in conjunction with the accompanying drawings, in which:

FIG. 1 is a diagrammatic plan view of apparatus embodying the invention;

FIG. 2 is a diagrammatic elevational view of the apparatus shown in FIG. 1;

FIG. 4 is a plan diagrammatic view of a modification of the invention.

Figure 3:
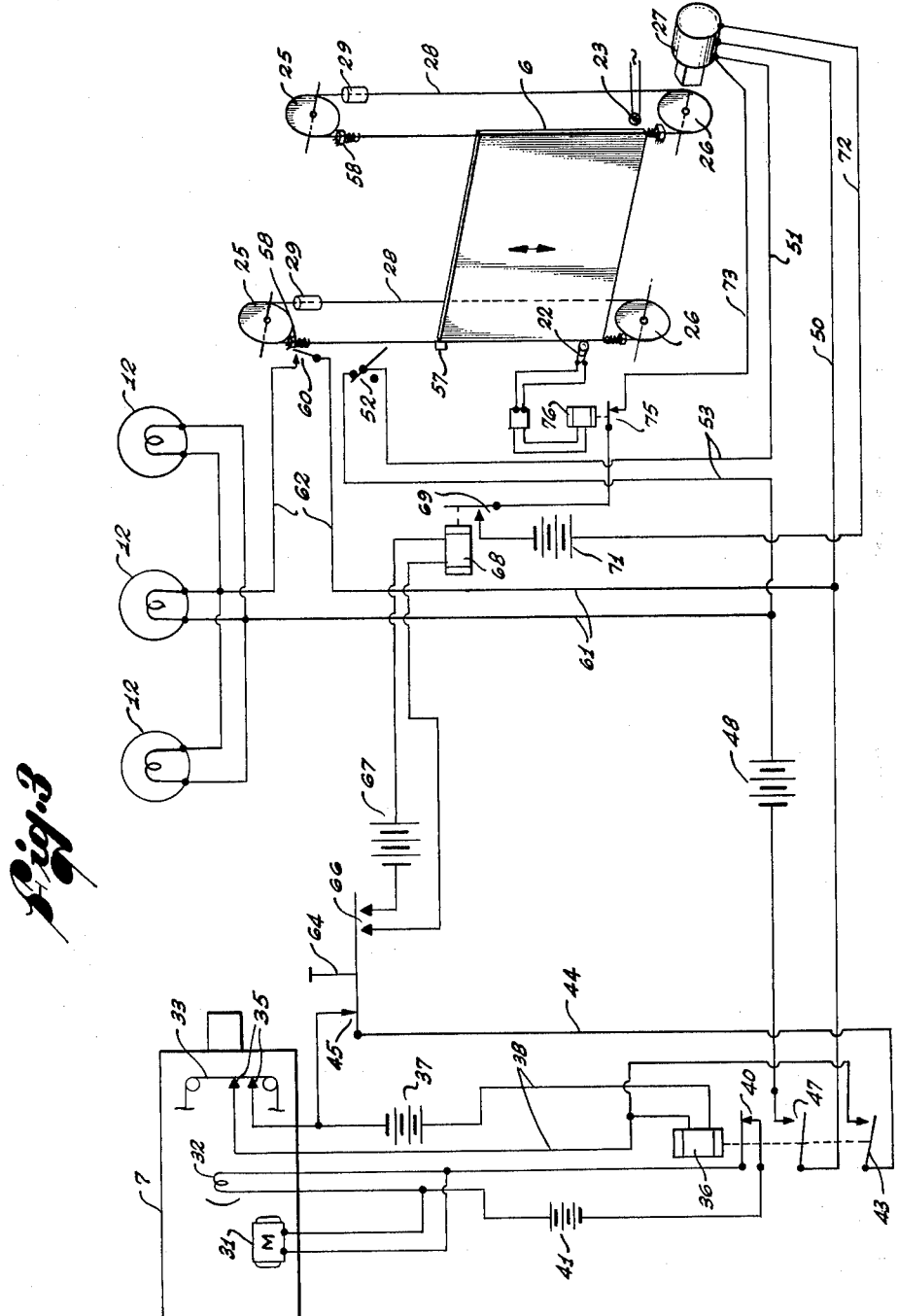
FIG. 3 is a schematic circuit diagram of the mechanical and electrical system embodying the invention.

Referring, now, to the drawings in which the same numerals identify the same elements, a stage platform 5 is shown with a front opaque motion picture screen 6 and a projector 7 which projects light images on the screen as shown by the light rays 8 and 9. On the stage platform 5 are shown lamps 12, other similar lamps being positioned above the stage or about the auditorium. Shown at positions 13, 14, and 15 are certain articles which may be on the stage, such as a table, dresser, floor lamp, etc., as shown in FIG. 2. By the footprints 17, 18, and 19, the positions of the actors are shown at the time of a certain transition between a certain picture scene and live action, or vice versa. At one end of the lower position of the screen 6 is a photoelectric cell 22 and a light source 23 which comprise a protective system and a motor control when the screen is replaced and which will be further explained in connection with FIG. 3.

The rapidity of transition between picture action and live action is dependent upon the speed of removal of the screen upon which the picture is projected and its return to picture projection position. Although several mechanical systems are possible to accomplish this result, applicant has found two systems practical. As shown in FIG. 2, the motion picture screen 6 is on a loop around pulleys 25 and 26 driven by a motor 27. As shown in FIG. 2, a weight 29 is mounted on two cables 28 spanning the screen to counterbalance the weight of the screen 6, the screen being raised by the motor 27 at the proper time and then returned to the position shown in FIG. 2, as will be explained. When the motor 27 is energized, the screen 6 raises vertically out of viewing position and out of view of the audience with respect to the action on stage 5, this being done during the dark interval when the projection light is extinguished and the stage and house lights have not yet been energized. The system for accomplishing this operation is shown in FIG. 3 and will now be described.

In FIG. 3, the lamps 12 are illustrated diagrammatically along with the projector 7 in which is a projector motor 31 and a projection light source 32, FIG. 3 showing a film 33 being projected. On the film 33 is a magnetic strip, not shown, which, when reaching contacts 35, will short an energizing circuit including a relay 36, battery 37 and conductors 38. The energization of relay 36 will open contacts 40 to remove a power source 41 from the projector motor 31 and its projector lamp 32. Simultaneously, the contacts 43 will be made which will lock relay 36 in energized condition over conductor 44, contact 45, battery 37, and one of conductors 38. Furthermore, when contact 47 is made, it will energize, over a battery 48, motor 27 over conductors 50 and 51, normally closed contact 52 and conductors 53. Thus, the closing of contact 47 energizes motor 27 and drives the cable reels 26 and cables 28 to raise screen 6 to its upper position out of view of the observers.

Motor 27 is of the automobile starter type where a large amount of energy is rapidly applied so that the screen 6 is given a rapid acceleration upwardly. However, the screen contact element 57 will open contact 52 as it passes contact 52 which will de-energize motor 27 and will permit the screen 6 to coast at a rapid rate until stopped by upper spring or magnetic brakes 58. When the contact element 57 reaches its upper position, it will close contact 60 which will permit battery 48 to energize the lamps 12 over conductors 61 and 62. Thus, when the screen 6 has reached its upper position, which is during the time the projector light 32 is off and the stage is darkened, the lamps 12 are energized to illuminate the set and actors on the stage as illustrated in FIGS. 1 and 2. The contacts 60 are held closed by contact element 57 when the screen is in its upper position but will open when the screen is started toward its lower position.

When the stage is illuminated and the projector is not running, the actors provide the action as called for by the script in connection with the previous picture sequence. Furthermore, the live scene on the stage with illustrated props 13, 14, and 15 and the actors 17, 18, and 19 may be positioned previously to the projection of the picture scene or during the projection of the picture, since the screen is opaque. Also, since the stage is darkened during the removal and replacement of the screen, observers are practically unaware of the transition from picture to live action, and vice versa. In this manner, the actors are given complete freedom of movement about the stage whether the action is drama, dancing, or instruction.

When the script calls for a transition from live action to picture action, a signal may be given to the operator, or he may follow a cue sheet, and at the proper time when the stage and actors are in certain predetermined positions, the operator will actuate a pushbutton switch 64 which will break contact 45 to unlock relay 36, close contact 40, and, thus, energize the projector motor 31 and projection lamp 32. De-energization of relay 36 also breaks the contact 47 which energizes the lamps 12. Thus, as the stage and house lights 12 are extinguished and the projection lamp 32 is being energized, the screen 6 is lowered. This is accomplished by the pushbutton 64 making contacts 66 which, through battery 67, energizes a relay 68. The relay 68, in turn, closes its contacts 69 and over battery 71 and conductors 72 and 73, energizes the reverse phase of the motor 27 to lower the screen 6. As the screen 6 is lowered, the contactor 57 will close contacts 52 to ready the system for the next raising sequence.

It will be noted that the energization of the motor 27 for lowering the screen is through contacts 75 controlled by relay 76 from the photocell 22. Thus, any obstruction in the path of the screen during the lowering thereof will de-energize motor 27, which is a safety measure. Also, if the operator fails to release pushbutton switch 64 at the proper time, the screen will actuate relay 76 to break the motor 27 energizing circuit at contacts 75. Magnet or spring brakes similar to brakes 58 are provided to stop the screen 6 in its lower position.

Referring, now, to FIG. 4, a type of dissolving screen is illustrated in which a motor 80 may move a screen horizontally as indicated by the double arrow 81 between the projection light ray lines 82 from a projector 83. In this case, the screen may vary in density between a fully opaque section 85, a variable density section 86, illustrated by a thickness taper, and a transparent section 87, or no screen at all by screen moving cables. Thus, when the motor 80 shifts the screen horizontally in either direction, a slow dissolve effect is produced between the picture and live action by the section 86. The screen movement and stage lighting may be controlled as described above and shown in FIG. 3. With the screen shown in FIG. 4, rear lighting of the section 86 under dimmer controls will fade the picture image along with the slow extinguishing of the picture projector lamp. The section 86 may be made by a half tone silk screen process on rear projection screen material or similar material.

When large screens are desired and the single movement thereof is impractical, the screen may be made in sections which are moved individually, or the screen may be in triangular sections which are individually movable similar to a camera lens.

The above method of and system for shifting between live and picture scenes provides transitions which are substantially undetectable by observers and produce spectacular effects in theatrical presentations as well as particularly efficient effects for training films. Although an electrical system of control has been described and illustrated, certain portions of the system can be manipulated manually.

I claim:

1. A method of shifting from a scene projected onto a screen to a live scene on a stage behind said screen corresponding to the projected scene on said screen comprising:
    (a) projecting a picture on said screen,
    (b) setting a stage behind said screen to correspond to the picture projected on the screen at a given instant,
    (c) discontinuing the projection of said picture onto said screen at said given instant,
    (d) providing said screen with a high energy driving motor to remove said screen from in front of said stage at a high rate of speed,
    (e) energizing said motor and removing said screen at a high rate of speed,
    (f) illuminating said stage scene when said screen has been removed, and
    (g) controlling said discontinuation, energization and illumination in coordination with said projected scene on said screen.

2. The method as defined in claim 1 including controlling said illumination by the location of said screen.

3. The method as defined in claim 1 including extinguishing the stage illumination, returning said screen to said stage and again projecting a scene onto said screen.

4. A system for shifting from a scene projected onto a screen to a live scene on a stage behind said screen comprising:
    (a) an opaque picture screen movable from a first picture receiving position to a second position out of view of the observer,
    (b) a picture projector including a film, a film advancing means and a light source for projecting a picture onto said screen,
    (c) means for extinguishing said light source and thus discontinuing the projection of said picture onto said screen,
    (d) a high energy motor means for rapidly moving said screen between said two positions while said projection is discontinued,
    (e) means for illuminating said stage after said screen reaches its second position, and
    (f) means controlled by the position of said film in said projector for stopping said film advancing means, extinguishing said light source, energizing said screen moving means and energizing said stage illuminating means.

5. A system as defined in claim 4 including, means actuated by said screen for de-energizing said motor and controlling the energization of said stage illuminating means.

6. A system as defined in claim 4 wherein means is provided for preventing said screen from returning to said first position if an article is located in its path.

References Cited by the Examiner

UNITED STATES PATENTS

| 2,147,648 | 2/1939 | Greathouse | 272—10 |
| 2,840,659 | 6/1958 | Cooley | 200—61.4 X |

RICHARD C. PINKHAM, *Primary Examiner.*

F. B. LEONARD, *Assistant Examiner.*